Figure 1:
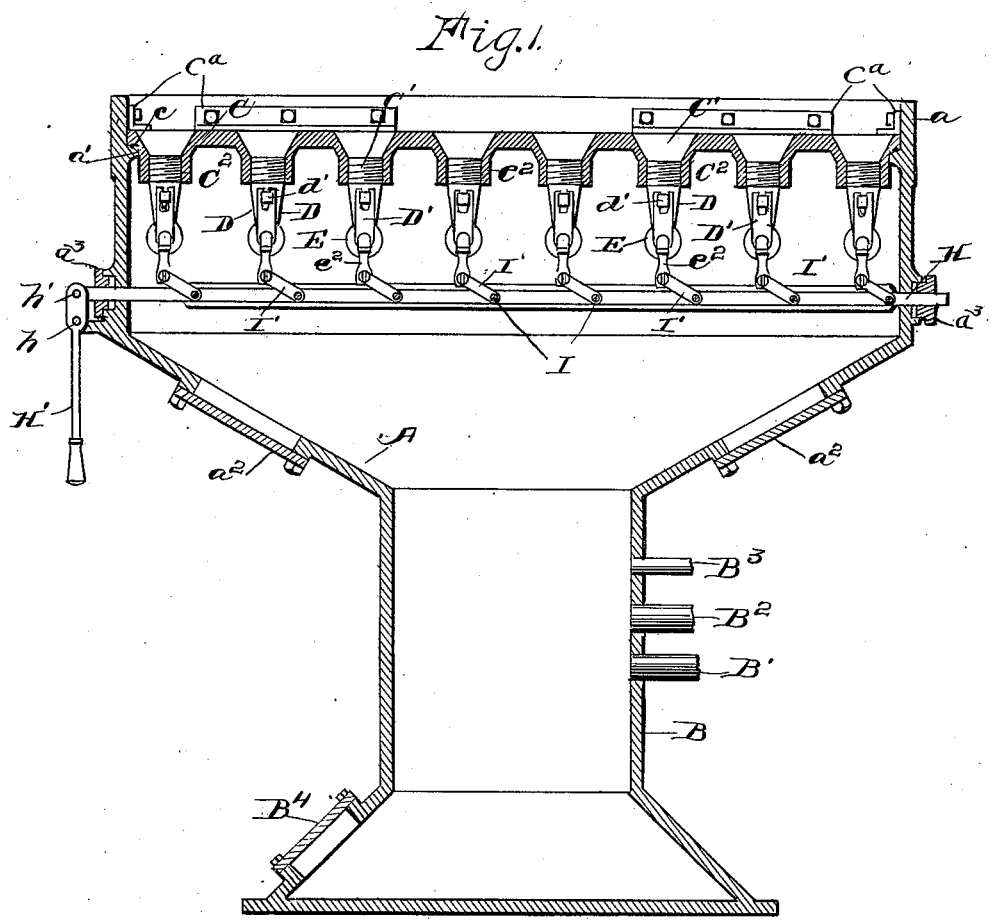

No. 664,088. Patented Dec. 18, 1900.
I. H. JEWELL.
ACCESSIBLE FILTER SCREEN.
(Application filed Apr. 16, 1900.)

(No Model.) 3 Sheets—Sheet 1.

Witnesses:
C. R. Stickney.
William L. Hall.

Inventor:
Ira H. Jewell.
by Poole & Brown
his Attys.

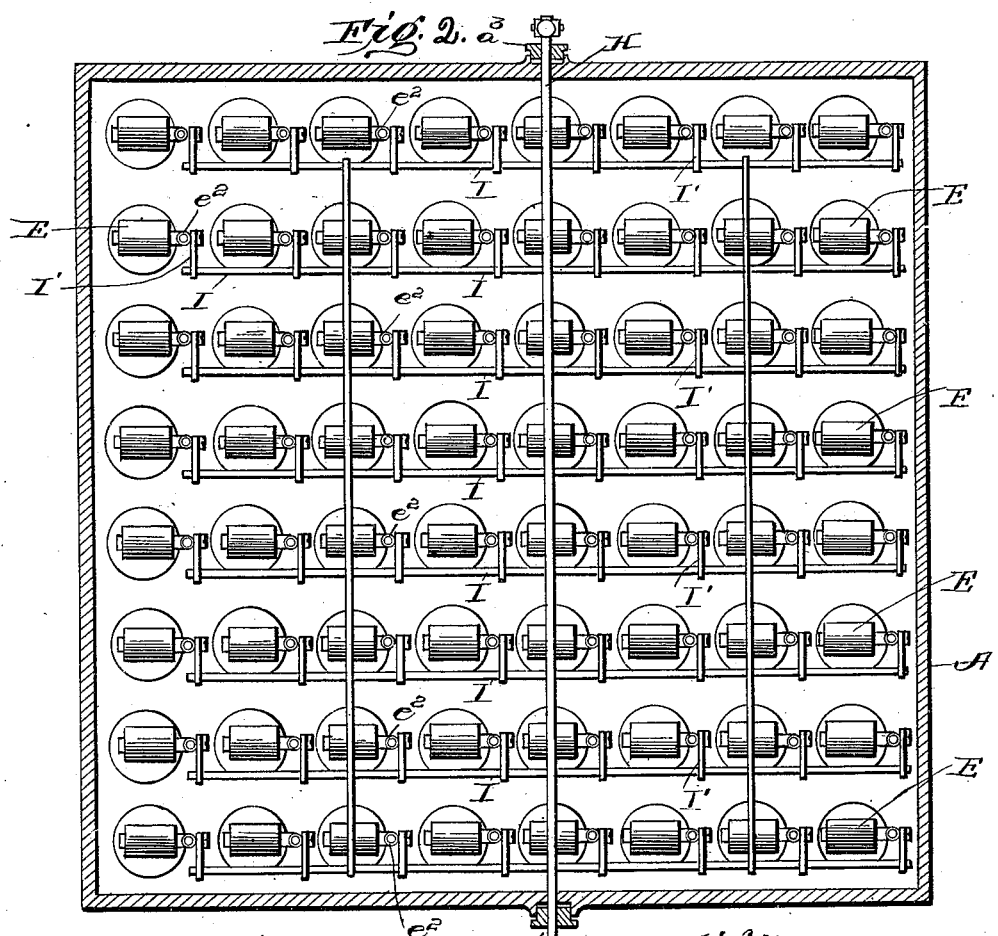

No. 664,088. Patented Dec. 18, 1900.
I. H. JEWELL.
ACCESSIBLE FILTER SCREEN.
(Application filed Apr. 16, 1900.)
(No Model.) 3 Sheets—Sheet 3.
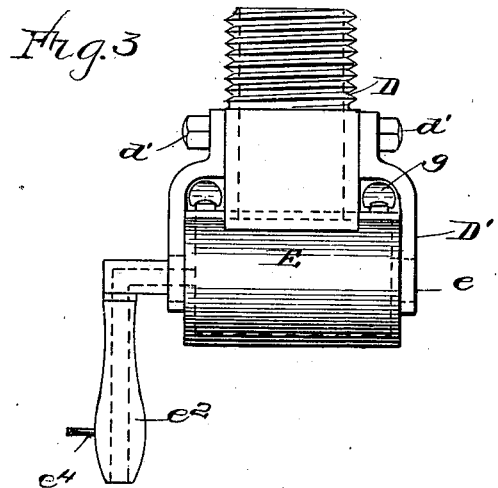
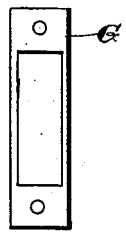
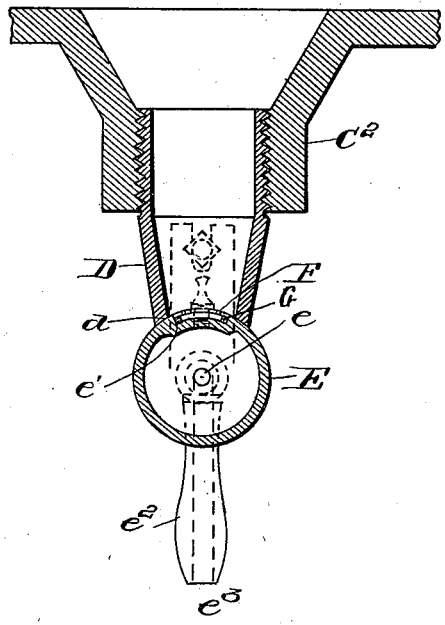
Witnesses:
C. M. Stickney,
William H. Hall
Inventor:
Ira H. Jewell.
by Poole & Brown
his Attys

UNITED STATES PATENT OFFICE.

IRA H. JEWELL, OF CHICAGO, ILLINOIS.

ACCESSIBLE FILTER-SCREEN.

SPECIFICATION forming part of Letters Patent No. 664,088, dated December 18, 1900.

Application filed April 16, 1900. Serial No. 13,035. (No model.)

*To all whom it may concern:*

Be it known that I, IRA H. JEWELL, of Chicago, in the county of Cook and State of Illinois, have invented certain new and useful Improvements in Accessible Filter-Screens; and I do hereby declare that the following is a full, clear, and exact description thereof, reference being had to the accompanying drawings, and to the letters of reference marked thereon, which form a part of this specification.

This invention relates to improvements in accessible filter-screens constructed so as to be cleaned or repaired without removing the filter-bed and without discontinuing the operation of the filter. A filter of this type is shown in my prior patent, No. 646,837, granted April 3, 1900, wherein the filter-screens are shown made of relatively large diameter.

One of the objects of this invention is to provide filters of this character with accessible screens of small or the usual diameter and which may be arranged at close intervals beneath the filter-bed.

Another object of this invention is to provide a novel form of support for the screen constructed to close the discharge-opening beneath the filter-bed when the screen is exposed.

A further object of the invention is to provide means for use in connection with a number of adjacent screens, whereby a number of adjacent screens may be simultaneously exposed for cleaning or repairing.

A still further object of the invention is to provide means for breaking up or fractionating the washing current whereby the wash-water may be uniformly distributed throughout the bed and for effectively collecting the filtered water from the bed.

To these ends my invention consists of the matter hereinafter set forth, and more particularly pointed out in the appended claims.

In the drawings, Figure 1 is a vertical section taken through a section of a filter-bed constructed in accordance with my invention. Fig. 2 is a bottom plan view of the perforated distributing-plate on the screen-supports and parts associated therewith. Figs. 3, 4, and 5 are details of an improved form of a support for the screen and water-discharge passages. Figs. 6 and 7 are details of a modified form of such parts.

As shown in the drawings, A designates what may be considered as a "section" of a filter-bed bottom, or which may be considered as a bed-bottom of a complete unit of small area. The lower end of said section is made conical or funnel-shaped, with its smaller end directed downwardly. When part shown in Fig. 1 is a section of a bed-bottom, the upper margins $a$ thereof constitute flanges by which the section may be joined to adjacent sections.

B designates a tubular column which is connected at its upper end with the lower end of the funnel-shaped section and is made of such length as to afford a support for that part of the filter located above the same. With said column are connected a filtered water-effluent pipe B', a wash-water-inlet pipe $B^2$, and an air-inlet pipe $B^3$. The column is provided at its lower end with a hand-hole covered by a plate $B^4$, by which access may be had to the lower end of the column to remove sand or the like which may escape from the bed-bottom thereinto, said part of the column below the effluent-pipe constituting a sand-trap to catch such dislodged particles of sand.

C designates a horizontal plate located at the upper end of the section and supported on inwardly-extending flanges $a'$ of said section and secured from rising off the same in any suitable manner. A convenient means of fastening the plate in position is shown in Fig. 1, wherein a plurality of short angle-strips $c^a$ are attached to the inner walls of the filter-section by bolts or the like and bear against the upper face of the plate C. The proximate faces of the plate and flange will desirably be provided with registering grooves, within which are located cylindric packing-strips $c$ to provide a tight joint between the same. Said plate is provided with a plurality of through-openings C', preferably disposed in parallel rows, constituting discharge-openings from the filter-bed to the column, and which serve to subdivide the wash-current passing upwardly from the column to the filter-bed above and to collect the filtered water from the bed. In line with said openings and below the same are arranged a plurality of screens, through which the water passes from the bed to the column. Said screens are carried by supports so constructed and arranged that when the screens are moved out of alinement with the openings C' the passage of the water through the openings is cut off. In the present instance the plate C is provided on its lower surface with a plurality of nipples $C^2$, in line with the openings C', herein shown as made integral with the plate. The upper ends of the bore of the nipples and the openings C' are upwardly flaring to bring the margins of the openings closer together and avoid objectionable dead spaces in the plate.

The screen-supports may be seated directly against the nipples, but as a preferred construction I provide a plurality of nipple extensions D, which are screw-threaded at their upper ends and engage interior screw-threads in the lower ends of the nipples $C^2$ and project below the latter. Said nipple extensions are provided at their lower ends with seats $d$, which are engaged by screen-supports consisting of rotative barrels E, provided at their ends with trunnions $e$, which have bearing engagement with vertical yoke-arms D', attached at their upper ends to the nipple extension, whereby the barrel may be rotated with its periphery in contact with the seats $d$ of the nipple extension. The cylindric wall of each barrel is imperforate, except for an opening in one part thereof, which is constructed to contain a screen F. Said barrel may be rotated to bring the screen in line with the bore of the nipple extension or to expose said screen at one side of the nipple and bring an imperforate part of the barrel in line with the nipple to cut off the passage of water therethrough. The barrel is provided around the opening therein with a depressed seat $e'$, within which is located a screen-frame G, which holds the screen in place. The frame extends to the outer ends of the barrel and is attached at its ends to said barrel by means of thumb-screws $g$ passing therethrough and into the wall of the barrel. The barrel is provided with an operating-lever $e^2$, through which rotary motion is given thereto. In this instance the lever is provided with a central passage $e^3$, which constitutes the outlet from the hollow barrel. Obviously, however, the discharge of the barrel may be otherwise located.

In order to compensate for wear between the valve-seat $d$ and the barrel, the yoke-arms D' are slotted at their upper ends, through which slots pass the holding-screws $d'$, whereby said arms may be moved vertically upward to bring the barrel in proper contact with its seat.

The operation of the device described is as follows: The barrel is turned to the position shown in the figures, with the screen in line with the discharge-orifice of the nipple, in which position the water passes from the nipple to the barrel and escapes therefrom through the passage $e^3$ in the operating-lever. When it is desired to discontinue the operation of that part of the filter associated with one of the screens or it is desired to expose the screen for the purpose of cleaning or removing the same, the barrel is rotated to bring the imperforate portion thereof in line with the discharge-opening of the nipple, which movement shifts the screen out of its operative position and exposes the screen at one side of the nipple, so that it may be cleaned or removed, as desired. In order to gain access to the screen or screens thus exposed, the bed-bottom section is provided below the screens with one or more hand-holes covered by plates $a^2$, as shown in Fig. 1.

Desirably all of the valves of a single section are connected so as to be simultaneously actuated, whereby the screens of said section may be cut off from the bed and cleaned independently of the screens of other sections of the bed. An approved mechanism for effecting such simultaneous actuation of the screens and valves is shown in Figs. 1 and 2, and consists of a reciprocating rod or bar H, located below the screens and passing at its ends through the walls of the section A, said walls being provided with suitable stuffing-boxes $a^3$ to provide water-tight joints between said parts. Said reciprocating bar is operatively connected between its ends with a series of parallel rock-shafts I, disposed perpendicularly to the bar and located below and parallel with the rows of screens. Said rock-shafts I are each connected with the adjacent operating-levers $e^2$ of the screen-barrels by means of links I', said links in this instance being rotatively connected at their lower ends with the shafts and at their upper ends with laterally-projecting lugs $e^4$ on said operating-levers. As herein shown, the rock-shafts I pass through openings in the reciprocating bar H, but may be otherwise connected therewith. The said reciprocating bar is provided at one end thereof, outside the section A, with an actuating-lever H', which is pivoted between its ends to the section-wall on a pivot pin or stud $h$ and connected at its upper end with the adjacent end of the bar by a pivot-pin $h'$. With this construction when the bar or shaft H is moved endwise through application of power to the lever H' it acts through the rock-shafts I and links I' to swing the levers $e^2$, connected therewith, in one direction, and therethrough rotates the barrels, so as to move the screens into or out of alinement with the discharge-orifices of the nipples depending on the direction of movement of said bar.

It will be understood that when a number of sections like that shown in Fig. 1 are embodied in the single filter unit suitable provision may be made to actuate the screens of each section from outside the unit structure. By reason of the fact, however, that the columns B are situated a sufficient distance apart to permit an attendant to pass between the same it may not be found in practice necessary to operate all of the valves from outside of the unit structure; but the valves of each section may be operated by its own lever H' or an equivalent device.

I have shown in Figs. 6 and 7 a modified form of the screen-support and closure. As shown in said figures, J designates a nipple, which corresponds in function to the nipple extension D and constitutes one of the discharge-orifices of the filter. K designates a horizontally-arranged oscillating plate which is pivoted at one side by means of a pivot-pin $j$ to a flange $j'$ on the lower end of the nipple J and extends entirely across the orifice of the nipple. Said plate is provided at one side thereof with an opening K', which is recessed at the lower surface of the plate to receive a screen-frame L, herein shown as made circular. M designates a screen which is interposed between the frame L and the recessed portion of the plate K and extends across the opening K' of said plate. Said screen-frame is held in place by means of screws $k'$ passing through the frame and into the plate. The horizontal plate K is provided on the side thereof opposite to the screened opening K' with an imperforate section $K^2$, and the pivot-pin of the plate is so located that said plate may be swung so as to bring either the screen or said imperforate section in line with the discharge-opening of the nipple J. The lower end of the nipple is provided on the side thereof opposite to the pivot-pin $j$ with a curved guide-groove $j^2$, which receives the adjacent edge of the plate and serves to hold the same in place, and said adjacent edge of the plate is curved about a center coincident with the pivot-aperture therein, whereby the curved edge of the plate is always in engagement with said guide-groove. When the filter is in operation, the plate will be swung to bring the screen in line with the discharge-orifice of the nipple, as shown in Fig. 6. When access to the screen is desired for the purpose of cleaning or removing the same or when for other purpose it is desired to discontinue the operation of the filter, the plate is swung to bring the imperforate portion thereof in line with the discharge-orifice of the nipple, which movement will expose the screen at one side of the nipple. The screen-holding plate K is provided with a shank or handle $K^3$, by which the same is operated, and the several shanks of the plates belonging to a given section when embodied in a filter in the manner of the construction shown in Fig. 1 may be connected with mechanism whereby the same may be simultaneously actuated.

While a screen-support and valve are herein shown as used in conjunction with a small screen, it will be understood that the same may be used with screens of larger diameter— such, for instance, as shown in my prior patent above referred to. It is to be further understood that the general form of the filter tank or bed bottom section may be varied and that the same need not be constructed to afford a supporting-column for the filter. Furthermore, one of the objects of locating the plate C below the filter-bed, in the discharge-orifice thereof, being to subdivide the upwardly-directed washing-current so that it may be distributed uniformly throughout the bed, it will be obvious that this function of the plate may be preserved with a different location and arrangement of the screens or screen-surface—as, for instance, the interposition of the plate between the filter-bed and screen shown in my prior patent hereinbefore mentioned.

Obviously the form of the screen-support may be greatly varied without departing from the spirit of the invention—as, for instance, the screen-holding plate shown in Figs. 6 and 7 may be constructed to be moved across the filter discharge-orifice in a direct line.

In filters of this class it is highly desirable that the total cross-sectional area of the water passage or passages through the screen or screens be maintained effectively equal to the cross-sectional areas of the effluent and wash-water pipes. By reason of the accessibility of the screens in the construction here shown I am enabled in the first instance to properly proportion said pipes and passages and to readily maintain the screens clear, so that the maintenance of the relations desired may be readily and effectively accomplished.

I claim as my invention—

1. A screen located at the discharge-opening of a filter, and means for shifting the said screen out of its operative position and exposing it to be removed or cleaned, said means being constructed to close the discharge-opening when the screen is so exposed.

2. A filter-screen located at the discharge-opening of a filter, and a movable support for the screen having an imperforate part, said support being constructed to move the screen out of line with the opening in position to expose the screen for removal or cleaning and to move the imperforate part of the support in position to close the opening when the screen is so exposed.

3. A screen located at the discharge-opening of a filter, a movable support therefor having an imperforate part, said support being constructed to move the screen out of line with the opening to expose the same for cleaning and to move the imperforate part into position to close the opening at the time the screen is so exposed, and adjusting means for said support.

4. A plurality of accessible screens located below a filter-bed, and means for simultaneously shifting the screens into and out of their operative positions.

5. A plurality of accessible filter-screens located below a filter-bed, and means whereby the screens may be simultaneously shifted into and out of their operative positions and the discharge-openings of the filter closed.

6. A plurality of accessible screens located below a filter-bed, and means accessible from outside the filter structure for simultaneously exposing the screens in position for removal or cleaning.

7. A filter provided between the bed thereof and the discharge-orifice of the filter with a plate having a plurality of discharge-openings and accessible screens located at said discharge-openings.

8. A filter having below the bed a discharge-orifice which terminates in a passage of less cross-sectional area than the orifice, a plate between said passage and discharge-orifice having a plurality of discharge-openings and accessible screens located at said openings.

9. A filter provided between the bed thereof and the discharge-orifice of the filter with a plate having a plurality of discharge-openings, screens located at said discharge-openings, and means for shifting said screens into and out of their operative positions, constructed to open and close said discharge-openings.

10. A filter provided below the bed thereof with a discharge-orifice, a nipple communicating with said orifice, a movable support coacting with a seat formed on said nipple, said support being provided with an opening, and a screen located in said opening adapted to be moved by the support into line with said nipple.

11. A filter provided below the bed thereof with a discharge-orifice, a nipple communicating with said orifice, a rotative barrel coacting with a seat formed on said nipple, said barrel being provided with an opening, and a screen located in said opening and designed to be moved by the barrel into line with the nipple.

12. A filter provided below the bed thereof with a discharge-orifice, a nipple communicating with said orifice, a rotative barrel coacting with a seat formed on said nipple, said barrel being provided with an opening, a screen located in said opening, and means for adjusting the barrel with respect to its seat.

13. A filter provided beneath the bed thereof with a discharge-orifice, an accessible filter-screen within said orifice, and a plate between said screen and bed designed to fractionate or subdivide an upwardly-directed washing-current.

14. A filter provided beneath the bed thereof with a discharge-orifice which is made of decreasing diameter from its upper to its lower end, an accessible screen in said orifice, and a plate at or above the largest part of the orifice, designed to fractionate or subdivide an upwardly-directed washing-current.

15. Means for subdividing or fractionating the distribution of the filtered and wash water below the filter-bed, wherein the total cross-sectional area of the water-passage through the screens is maintained effectively equal to the cross-sectional area of the main effluent and wash-water pipes leading respectively from and to the filter, embracing an accessible screen or screens.

In testimony that I claim the foregoing as my invention I affix my signature, in presence of two witnesses, this 13th day of April, A. D. 1900.

IRA H. JEWELL.

Witnesses:
C. A. NEALE,
WILLIAM L. HALL.